United States Patent
Lin et al.

(10) Patent No.: US 10,705,366 B2
(45) Date of Patent: Jul. 7, 2020

(54) METHOD FOR FABRICATING MICRO-CELL STRUCTURES

(71) Applicant: National Sun Yat-sen University, Kaohsiung (TW)

(72) Inventors: Tsung-Hsien Lin, Kaohsiung (TW); Cheng-Chang Li, Kaohsiung (TW); Heng-Yi Tseng, Kaohsiung (TW); Hung-Chang Jau, Kaohsiung (TW); Jin-Wei Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 203 days.

(21) Appl. No.: 15/963,108

(22) Filed: Apr. 26, 2018

(65) Prior Publication Data
US 2019/0331956 A1 Oct. 31, 2019

(51) Int. Cl.
*G02F 1/1333* (2006.01)
*C09K 19/54* (2006.01)
(Continued)

(52) U.S. Cl.
CPC ........ *G02F 1/133377* (2013.01); *C09K 19/36* (2013.01); *C09K 19/542* (2013.01);
(Continued)

(58) Field of Classification Search
None
See application file for complete search history.

(56) References Cited

U.S. PATENT DOCUMENTS

| | | | | |
|---|---|---|---|---|
| 4,688,900 A | * | 8/1987 | Doane | C09K 19/00 349/20 |
| 5,621,552 A | * | 4/1997 | Coates | C09K 19/544 349/86 |

(Continued)

FOREIGN PATENT DOCUMENTS

| | | | |
|---|---|---|---|
| CN | 106566562 A | * | 4/2017 |
| TW | 200817759 A | | 4/2008 |
| TW | 200838991 | | 10/2008 |

OTHER PUBLICATIONS

Machine translation of CN 106566562 A, retrieved from Espacenet Jan. 6, 2020.*

*Primary Examiner* — Peter L Vajda
*Assistant Examiner* — Paul Spiel
(74) *Attorney, Agent, or Firm* — Soroker Agmon Nordman

(57) ABSTRACT

A method for fabricating micro-cell structures is provided and has providing a liquid crystal mixture; performing a heating step on the liquid crystal mixture at a temperature ranging from 45° C. to 150° C., performing a heat induced phase separation step on the liquid crystal mixture at a thermal phase separation temperature for a thermal phase separation titre such that the liquid crystal mixture forms liquid crystal particles and a network light-curing adhesive, wherein the thermal phase separation temperature and the thermal phase separation time are determined by a changing rate of a bright area ratio of the liquid crystal mixture; and performing a photo-curing step on the liquid crystal mixture by emitting an ultraviolet light so that a plurality of micro-cell structures are formed. The micro-cell structures with different transparency are fabricated based on different values of the thermal phase separation temperature and the thermal phase separation time.

10 Claims, 8 Drawing Sheets

(51) Int. Cl.
*C09K 19/58* (2006.01)
*C09K 19/36* (2006.01)

(52) U.S. Cl.
CPC ...... *C09K 19/586* (2013.01); *C09K 2019/546* (2013.01); *G02F 2202/28* (2013.01)

(56) References Cited

U.S. PATENT DOCUMENTS

| | | | |
|---|---|---|---|
| 6,266,109 B1* | 7/2001 | Yamaguchi | G02F 1/1334 349/86 |
| 2008/0084522 A1 | 4/2008 | Lee et al. | |
| 2015/0344781 A1* | 12/2015 | Chen | C09K 19/062 252/299.64 |
| 2018/0163460 A1* | 6/2018 | Lin | E06B 9/24 |

* cited by examiner

METHOD FOR FABRICATING MICRO-CELL STRUCTURES

FIELD OF DISCLOSURE

The present disclosure relates to a method for fabricating micro-cell structures, and more particularly to a method for fabricating micro-cell structures performed on a liquid crystal mixture.

BACKGROUND OF DISCLOSURE

Scattering-type liquid crystal light valves have been quite mature in the last decade or so, which are mainly used in polymer-dispersed liquid crystals (PDLC). PDLE consists of a mixture of polymers and liquid crystals, and the polymers and the liquid crystals are made using a phase separation method. In most cases of the phase separation method, phase separation of the mixture material occurs by emitting an ultraviolet light or by a thermal process, such that the scattering-type liquid crystal light valves are in a scattering state under no applied voltage. In addition, switching between the scattering state and a light-transmitting state can be achieved by applying a voltage, and an applied voltage is needed to apply in this type of scattering-type liquid crystal light valve so as to fix the light-transmitting state of the light valve.

If a negative-type liquid crystal material (such as, a negative-type cholesteric liquid crystal material) is doped with salt-type ionic material, the degree of consistency or disorder of a cholesteric liquid crystal alignment can be directly controlled by a high voltage or a low voltage without having to unscrew a structure of the cholesteric liquid crystal alignment, such that the cholesteric liquid crystal is switched to a light-transmitting planar structure or a scattering focal conic structure and retains its bistable properties. Compared with PDLC, the cholesteric liquid crystal has a relatively fast switching speed (about several hundred microseconds), a relative small applied voltage, and a relatively high contrast. Further, the cholesteric liquid crystal has a quite good tolerance of materials and surface treatment.

As a result, researchers began to try to apply the above technology to smart windows. By applying different voltages to the cholesteric liquid crystal to form the light-transmitting planar structure or the scattering focal conic structure, the smart windows can have an effect of light transmission (corresponding to the planar structure) or an opaque effect (corresponding to the focal conic structure). However, at present, no researchers have developed suitable fabricating methods to commercialize the smart windows.

As a result, it is necessary to provide a method for fabricating micro-cell structures to solve the problems existing in the conventional technologies as described above.

SUMMARY OF DISCLOSURE

An object of the present disclosure is to provide a method for fabricating micro-cell structures, in which a thermal phase separation temperature and a thermal phase separation time of a heat induced phase separation step are determined by a changing rate of a bright area ratio of a liquid crystal mixture, such that the micro-cell structures with different translucency can be fabricated according to requirements and can be applied to smart windows.

Another object of the present disclosure is to provide a method for fabricating micro-cell structures, which a network photo-curing adhesive is photo-cured as a supporting material between a first transparent substrate and a second transparent substrate, such that the micro-cell structures can be disposed between the first transparent substrate and the second transparent substrate.

To achieve the above object, the present disclosure provides a method for fabricating micro-cell structures, including steps of: providing a liquid crystal mixture comprising: 15 wt % to 91 wt % of a negative type liquid crystal material; 0.0001 wt % to 5 wt % of a salt ionic material; 3 wt % to 40 wt % of a chiral molecule material; and 5 wt % to 40 wt % of a photocurable adhesive material; performing a heating step on the liquid crystal mixture at a temperature ranging from 40° C. to 150° C.; performing a heat induced phase separation step on the liquid crystal mixture at a thermal phase separation temperature for a thermal phase separation time such that the liquid crystal mixture forms a plurality of liquid crystal particles and a network photo-curing adhesive, wherein the thermal phase separation temperature and the thermal phase separation time are determined by a changing rate of a bright area ratio of the liquid crystal mixture; and performing a photo-curing step on the liquid crystal mixture by emitting an ultraviolet light so that the liquid crystal particles and the network photo-curing adhesive further form a plurality of micro-cell structures.

In some embodiments, the bright region ratio of the liquid crystal mixture is proportional to an area ratio of the liquid crystal particles distributed in the liquid crystal mixture.

In some embodiments, the changing rate of the bright area ratio is a rate of the bright area ratio of the liquid crystal mixture changing with passage of per unit time.

In some embodiments, the changing rate of the bright area ratio changes from −1% to +1% with passage of per second.

In some embodiments, the negative type liquid crystal material is selected from a group consisting of a negative type liquid crystal MLC2081, a negative type liquid crystal MLC2078, a negative type liquid crystal ZLI-2806, and a negative type liquid crystal ZLI2293.

In some embodiments, the salt ionic material is selected from a group consisting of a salt ionic TBATFB, a salt ionic R6G, NaCl, $KNO_3$, and $CaSO_4$.

In some embodiments, the chiral molecule material is selected from a group consisting of chiral molecule S811, chiral molecule R811, chiral molecule S1011, chiral molecule R1011, chiral molecule S5011, and chiral molecule R5011.

In some embodiments, the photocurable adhesive material is selected from a group consisting of a photocurable adhesive NOA63, a photocurable adhesive NOA65, a photocurable adhesive NOA73, and a photocurable adhesive NOA81.

In some embodiments, the method further comprises a disposing step after the heating step is performed, wherein the disposing step is to dispose the heated liquid crystal mixture between a first transparent substrate and a second transparent substrate.

In some embodiments, the photo-curing step is performed on the liquid crystal mixture by emitting the ultraviolet light with an intensity of 0.1 to 100 $mW/cm^2$ for 0.1 to 20 minutes.

DETAILED DESCRIPTION OF EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

Figure 1:
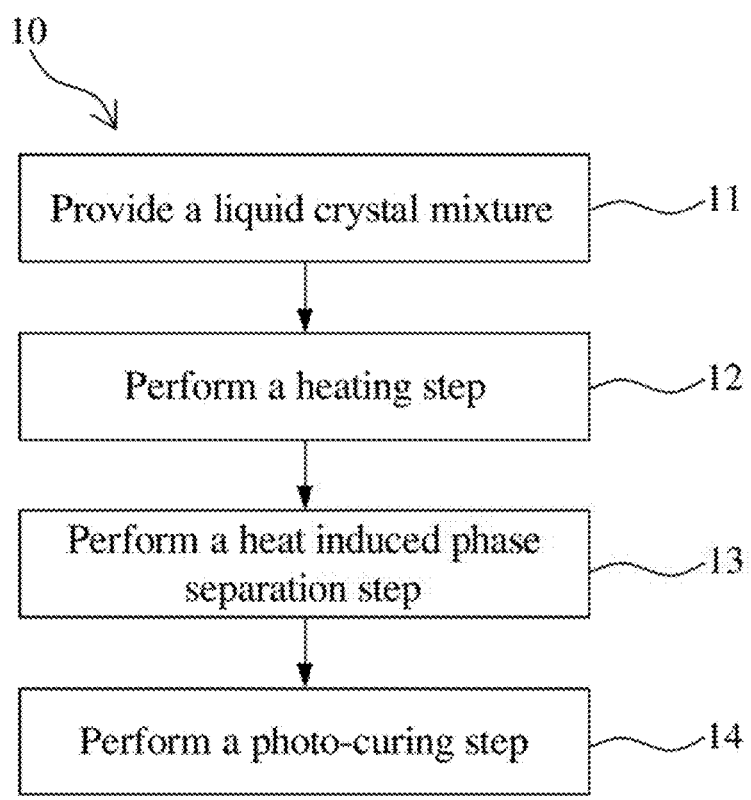
FIG. 1 illustrates a flowchart of a method of fabricating micro-cell structures according to an embodiment of the present disclosure.

Referring to FIG. 1, a method 10 for fabricating micro-cell structures of an embodiment of the present disclosure mainly includes steps 11 to 14 of: providing a liquid crystal mixture comprising: 15 wt % to 91 wt % of a negative type liquid crystal material; 0.0001 wt % to 5 wt % of a salt ionic material; 3 wt % to 40 wt % of a chiral molecule material; and 5 wt % to 40 wt % of a photocurable adhesive material (step 11); performing a heating step on the liquid crystal mixture at a temperature ranging from 40° C. to 150° C. (step 12); performing a heat induced phase separation step on the liquid crystal mixture at a thermal phase separation temperature for a thermal phase separation time such that the liquid crystal mixture forms a plurality of liquid crystal particles and a network photo-curing adhesive, wherein the thermal phase separation temperature and the thermal phase separation time are determined by a changing rate of a bright area ratio of the liquid crystal mixture (step 13); and performing a photo-curing step on the liquid crystal mixture by emitting an ultraviolet light so that the liquid crystal particles and the network photo-curing adhesive further form a plurality of micro-cell structures (step 14), The implementation details of the above-described steps and the principles thereof will be described in detail below.

In one embodiment of the present disclosure, the method 10 for fabricating micro-cell structures has step 11 of: providing a liquid crystal mixture comprising: 15 wt % to 91 wt % of a negative type liquid crystal material; 0.0001 wt % to 5 wt % of a salt ionic material; 3 wt % to 40 wt % of a chiral molecule material; and 5 wt % to 40 wt % of a photocurable adhesive material. In step 11, the negative type liquid crystal material, the salt ionic material, the chiral molecule material, and the photocurable adhesive material are provided and mixed to prepare the liquid crystal mixture. In one embodiment, the negative type liquid crystal material is a negative type cholesteric liquid crystal material and has at least two stable states (at least includes a light-transmitting planar structure or a scattering focal conic structure).

In one embodiment, the negative type liquid crystal material is, such as selected from a group consisting of a negative type liquid crystal MLC2081 (commercially available from Merck), a negative type liquid crystal MLC2078 (commercially available from Merck), a negative type liquid crystal ZLI-2806 (commercially available from Merck), and a negative type liquid crystal ZLI2293 (commercially available from Merck).

In one embodiment, the salt ionic material is, such as selected from a group consisting of a salt ionic TBATFB, a salt ionic R6G, NaCl, $KNO_3$, and $CaSO_4$, where a molecular formula of R6G refers to the following formula:

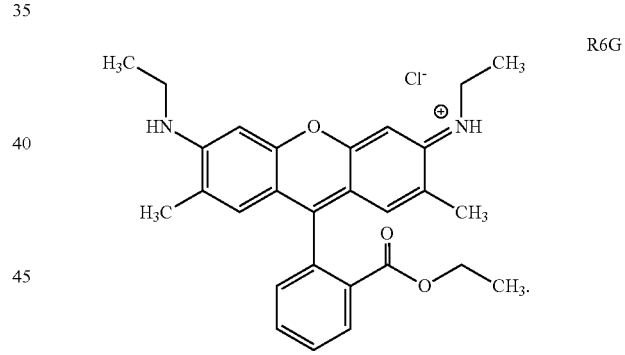

R6G

In one embodiment, the chiral molecule material is selected from a group consisting of chiral molecule S811, chiral molecule R811, chiral molecule S1011, chiral molecule R1011, chiral molecule S5011, and chiral molecule R5011. Molecular formulas of the chiral molecules are shown as follows, where R5011 and S5011 are symmetric structures to each other, and are represented by one structural formula:

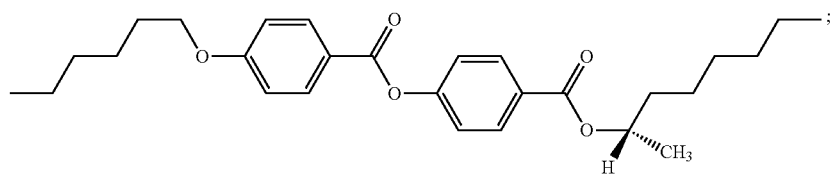

S811

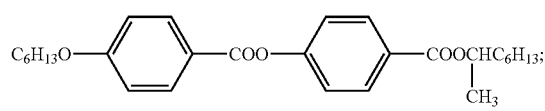

R811

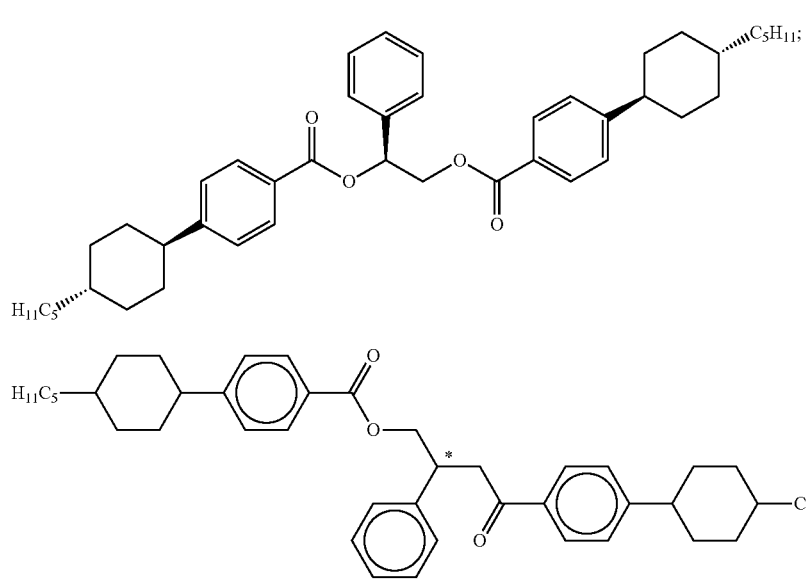

S1011

R1011

R5011/S5011

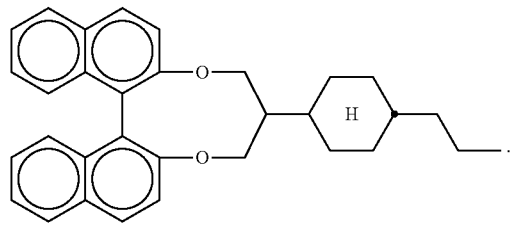

In one embodiment the photocurable adhesive material is selected from a group consisting of a photocurable adhesive NOA63 (commercially available from Norland Products), a photocurable adhesive NOA65 (commercially available from Norland Products), a photocurable adhesive NOA73 (commercially available from Norland Products), and a photocurable adhesive NOA81 (commercially available from Norland Products).

In one embodiment of the present disclosure, the method 10 for fabricating micro-cell structures has step 12 of: performing a heating step on the liquid crystal mixture at a temperature ranging from 40° C. to 150° C. In step 12, the liquid crystal mixture can be heated to about 90° C. to facilitate the subsequent heat induced phase separation step 13.

In one embodiment of the present disclosure, the method 10 for fabricating micro-cell structures has step 13 of: performing a heat induced phase separation step on the liquid crystal mixture at a thermal phase separation temperature for a thermal phase separation time such that the liquid crystal mixture forms a plurality of liquid crystal particles and a network photo-curing adhesive, wherein the thermal phase separation temperature and the thermal phase separation time are determined by a changing rate of a bright area ratio of the liquid crystal mixture. In step 13, the thermal phase separation temperature and the thermal phase separation time of the liquid crystal mixture will differ based on the material selected in the liquid crystal mixture. In one embodiment, even if an identical material is used, the use of different thermal phase separation temperatures will affect the required thermal phase separation time, Detailed experimental data will be described in the following paragraphs.

In one embodiment of the present disclosure, the method 10 for fabricating micro-cell structures has step 14 of: performing a photo-curing step on the liquid crystal mixture by emitting an ultraviolet light so that the liquid crystal, particles and the network photo-curing adhesive further form a plurality of micro-cell structures. In step 14, the photo-curing step is performed with the ultraviolet light having an intensity of 0.1 to 100 rW/cm$^2$ for 0.1 to 20 minutes. A purpose is to cause a curing effect on the network photo-curing adhesive such that the network photo-curing adhesive is used as a supporting structure of the micro-cell structures. The supporting structure can be used to support two transparent substrates (i.e., the first transparent substrate and the second transparent substrate) of the smart window. On the other hand, since the liquid crystal particles in the micro-cell structures are pinned by the network photo-curing adhesive, large-size smart windows can be prepared in advance, and then cut into small-sized smart windows according to user requirements. Therefore, the micro-cell structures are not leaked from the cutting position.

Figure 2A:
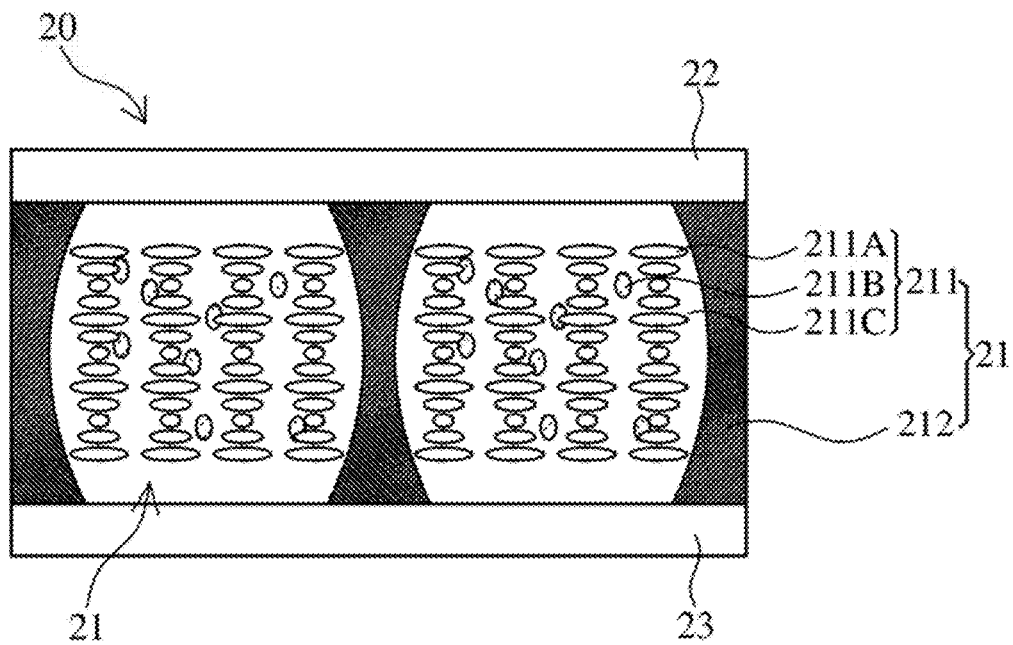
FIG. 2A illustrates a schematic cross-sectional diagram of the micro-cell structures (where the liquid crystal particles are in a planar structure stable state) disposed between two transparent substrate according to an embodiment of the present disclosure.
Figure 2B:
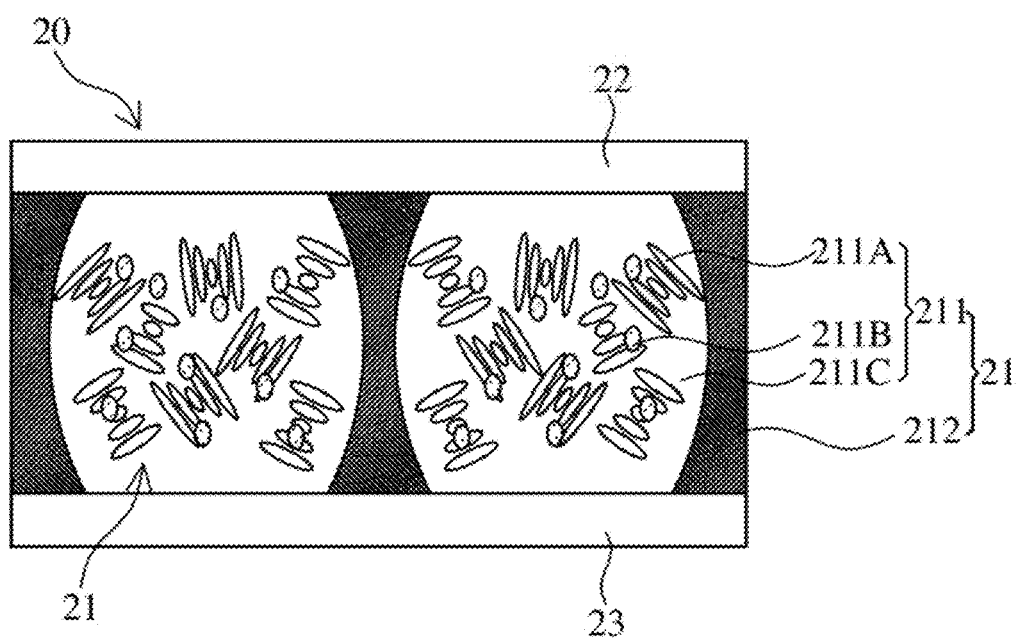
FIG. 2B illustrates a schematic cross-sectional diagram of the micro-cell structures (where the liquid crystal particles are in a focal conic structure stable state) disposed between two transparent substrate according to an embodiment of the present disclosure.

Please refer to FIGS. 1, 2A, and 2B, where FIG. 2A illustrates a schematic cross-sectional diagram of the micro-cell structures 21 (where the liquid crystal particles are in a planar structure stable state) disposed between two transparent substrate according to an embodiment of the present disclosure: and FIG. 2B illustrates a schematic cross-sectional diagram of the micro-cell structures 21 (where the liquid crystal particles are in a focal conic structure stable state) disposed between two transparent substrate according to an embodiment of the present disclosure. In one embodiment, a disposing step after the heating step is performed, wherein the disposing step is to dispose the heated liquid crystal mixture between a first transparent substrate 22 and a second transparent substrate 23. In other words, when the method 10 for fabricating micro-cell structures of the present disclosure is applied to a smart window 20, the liquid crystal mixture can be disposed between two light-transmitting substrates after the heating step is performed, and the micro-cell structures 21 (comprising the liquid crystal particles 211 and the network photo-curing adhesive 212, wherein each of the liquid crystal particles 211 includes a negative-type liquid crystal material 211A, a salt ionic material 211B, and a chiral molecule material 211C) can be completed through the subsequent steps. Therefore, the stable states of the micro-cell structures can be switched by applying different voltages, thereby changing the light transmittance of the smart window.

Hereinafter, it will be described how the method of fabricating the micro-cell structures of the present disclosure determines the thermal phase separation temperature and the thermal phase separation time of the heat induced phase separation step based on a changing rate of a bright area ratio of the liquid crystal mixture. At first, it is noted that the micro-cell structures mainly includes two portions including the liquid crystal particles and the cured photo-curing adhesive. In general, the liquid crystal particles can be switched between the light-transmitting planar structure and the scattering focal conic structure by applying different voltages in the liquid crystal particles. Therefore, light passes through the liquid crystal particles (in case of the light-transmitting planar structure) or the light is blocked by the liquid crystal particles (in case of the scattering focal conic structure). Further, the cured photocurable adhesive is used to support the entire structure and is substantially opaque. From the above, if the regions or ratios of the liquid crystal particles in the micro-cell structures are relatively large, the liquid crystal particles form a light-transmitting planar structure stable state and have a relatively large proportion of bright area (because the larger light-transmitting area is, the brighter or clearer the overall appearance is, i.e., they have a substantially proportional relationship). Conversely, if the regions of the network photo-curing adhesive in the micro-cell structures is relatively large, a supporting effect can be supported. However, when the liquid crystal particles form a light-transmitting planar structure stable state, the micro-cell structures have a relatively small bright area ratio (Because the light-transmitting area is smaller, the overall appearance is darker or more blurred).

In some embodiments, in order to make the micro-cell structures have a support structure that can support the substrate, the bright area ratio, of the liquid crystal mixture is used to determine parameters for the heat induced phase separation step. Referring to FIG. 3 and FIGS. 4A to 4F, FIG. 3 illustrates a diagram of a relationship between a bright region ratio and a size of the liquid crystal particles with respect to the thermal phase separation time in the case of using a thermal phase separation temperature of 10° C.; and FIGS. 4A to 4F illustrate electron microscope photos of using different thermal phase separation time (0 seconds, 37 seconds, 55 seconds, 120 seconds, 170 seconds, and 195 seconds, sequentially) in the case of using a thermal phase separation temperature of 10° C. From FIG. 3 and FIGS. 4A to 4F, before about 55 seconds, the bright area ratio has a relatively large growth rate, this is because the liquid crystal mixture has a significant phase separation effect during this period of time. After about 55 seconds, the proportion of bright areas has not changed significantly, but from FIGS. 4D to 4F, it can be seen that the liquid crystal particles begin to aggregate into larger liquid crystal particles, which in turn adversely affects the support effect of the light-reflective adhesive. Therefore, when the phase separation is about to be completed or just completed (for example, about 55 seconds in the present embodiment), the ratio of the liquid crystal particles and the photo-curing adhesive is not so large, so that the region of the cured network photo-curing adhesive is suitable for support when the photo-curing step is performed. From above, when the thermal induced phase separation step is performed, the thermal phase separation temperature and the thermal phase separation time can be determined according to the changing rate of the bright area ratio to obtain micro-cell structures with a high support effect and a high bright area ratio. In some embodiments, the changing rate of the bright area ratio can be a rate of the bright area ratio of the liquid crystal mixture changing with passage of per unit time. For example, when a status of the changing rate of the bright area ratio changing from −1% to +1% with passage of per second, the thermal phase separation temperature and the thermal phase separation time corresponding to the status are designed to be the parameters of the heat induced phase separation step.

Figure 3:
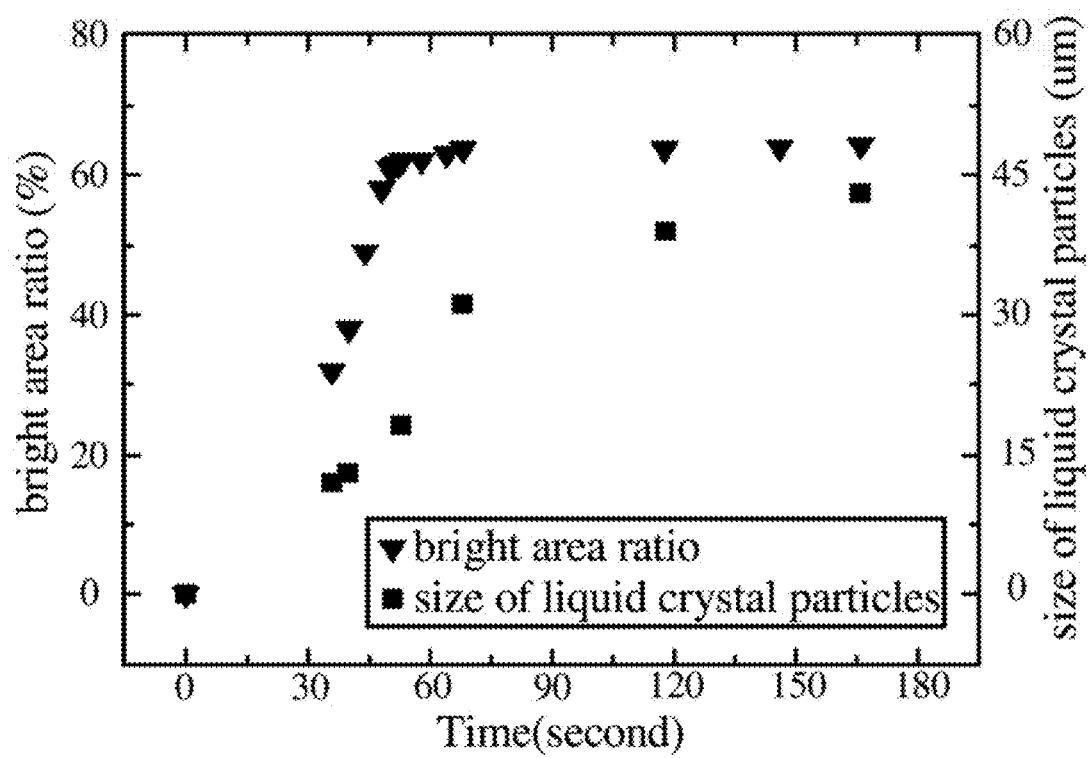
FIG. 3 illustrates a diagram of a relationship between a bright region ratio and a size of the liquid crystal particles with respect to the thermal phase separation time in the case of using a thermal phase separation temperature of 10° C.
Figure 4A:
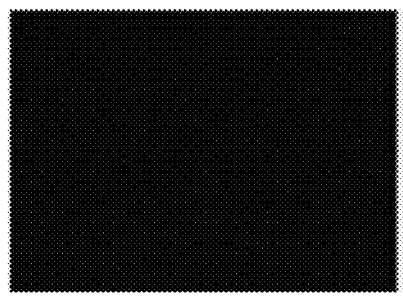
FIGS. 4A to 4F illustrate electron microscope photos of using different thermal phase separation time (0 seconds, 37 seconds. 55 seconds, 120 seconds, 170 seconds, and 195 seconds, sequentially) in the case of using a thermal phase separation temperature of 10° C.
Figure 4B:
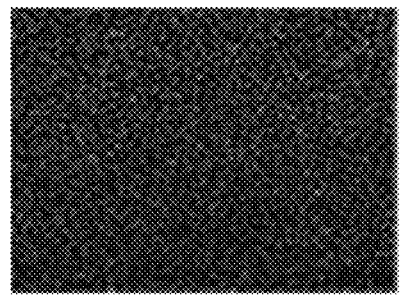
Figure 4C:
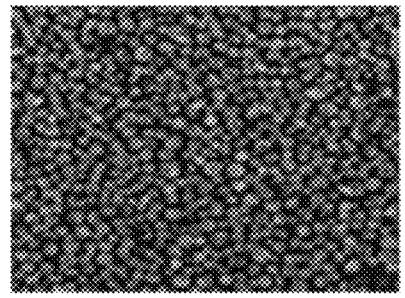
Figure 4D:
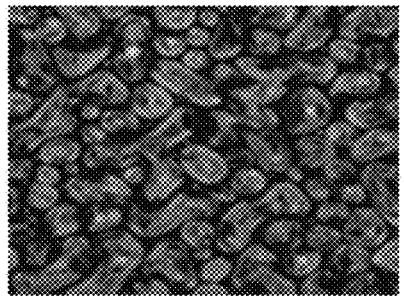
Figure 4E:
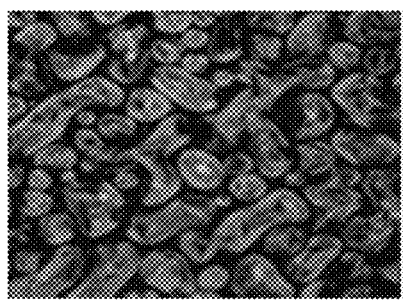
Figure 4F:
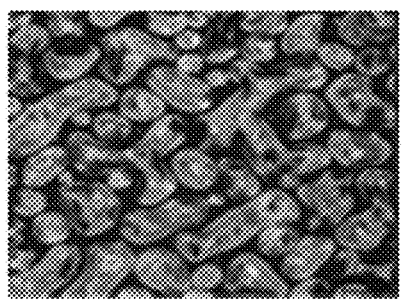
Figure 5A:
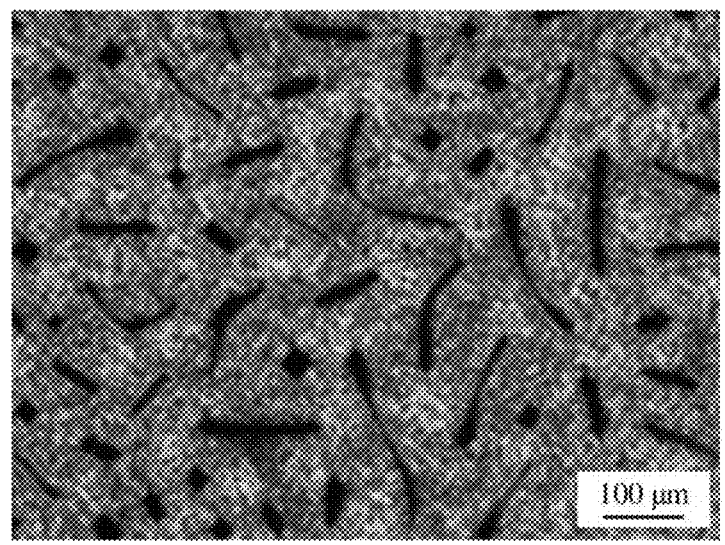
FIGS. 5A to 5F are electron microscope photos of using different ratio of photocurable adhesive material (15 wt %, 20 wt %, 25 wt %, 30 wt %, 35 wt %, and 40 wt %, sequentially) in the case of using a thermal phase separation temperature of 15° C. and using a thermal phase separation time of 55 seconds.
Figure 5B:
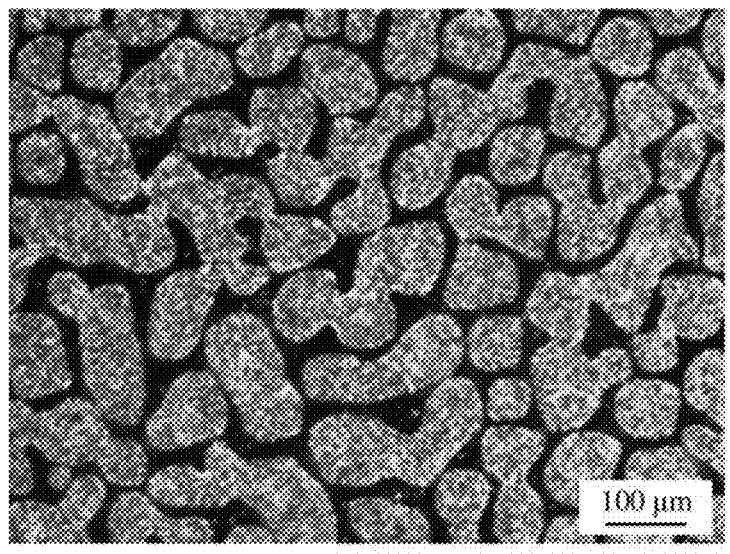
Figure 5C:
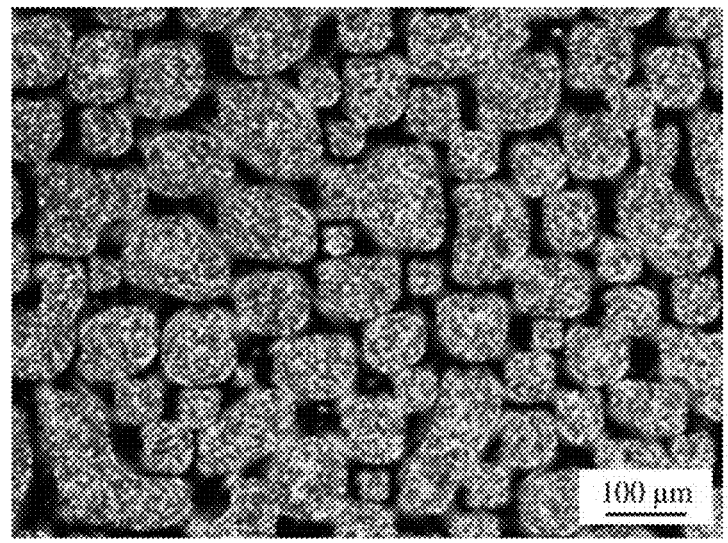
Figure 5D:
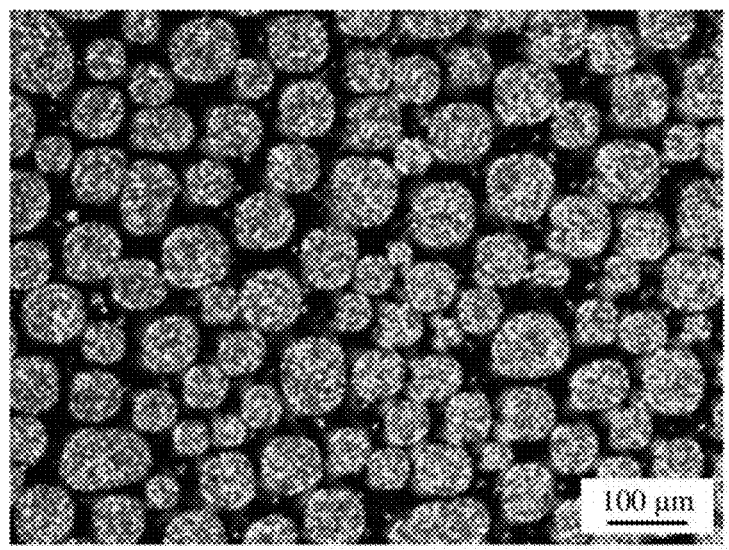
Figure 5E:
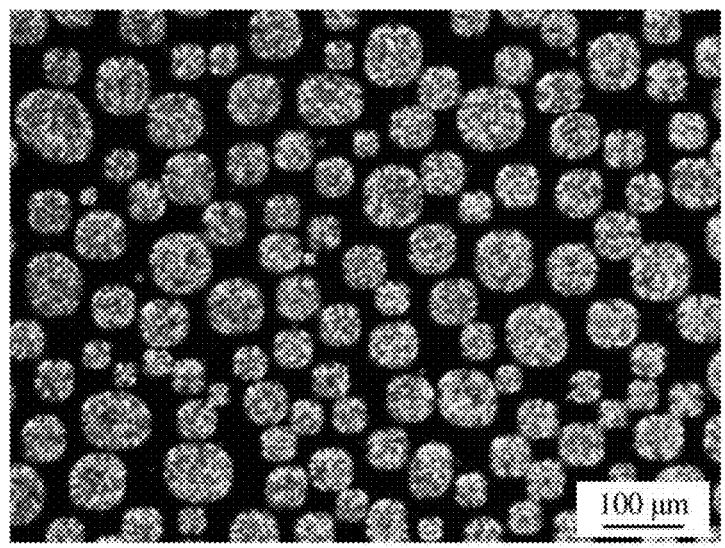
Figure 5F:
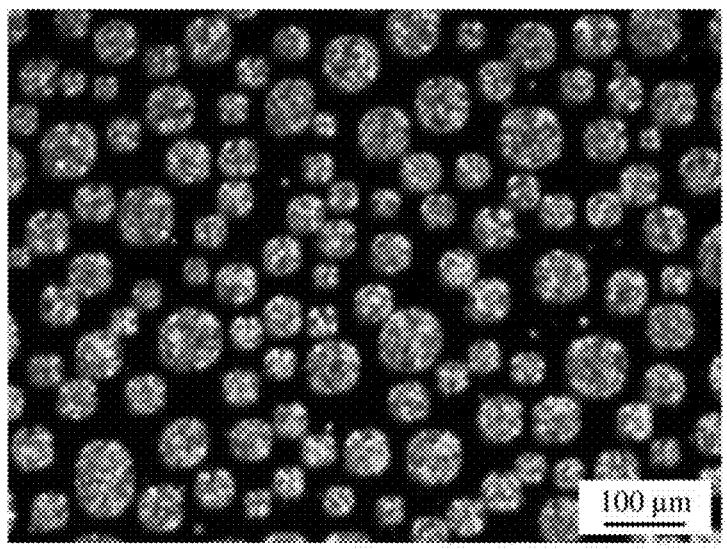

It is noted that according to the needs of a user, for example, when the user needs to obtain micro-cell structures with a relatively bright area ratio, the parameters of the heat induced phase separation step can also be determined according to the changing rate of the bright region ratio of the liquid crystal mixture. Referring to FIG. 3, for example, micro-cell structures with a relatively low bright area ratio can be obtained using a thermal phase separation temperature of 10° C. and a thermal phase separation time of about 37 seconds. In addition, the micro-cell structures with a relatively low proportion of bright areas can also have an advantage of high support strength.

In some embodiments, the method 10 for fabricating the micro-cell structures can also control thickness of the photocurable adhesive material by adjusting the proportion of the photocurable adhesive material. Please referring to FIGS. 5A to 5F, FIGS. 5A to 5F are electron microscope photos of using different ratio of photocurable adhesive material (15 wt 20 wt %, 25 wt %, 30 wt %, 35 wt %, and 40 wt %, sequentially) in the case of using a thermal phase separation temperature of 15° C. and using a thermal phase separation time of 55 seconds. From FIGS. 5A to 5F, when the proportion of the photo-curable adhesive material is larger, the thickness of the network photo-curing adhesive (black area in FIGS. 5A to 5F) is larger. However, when the thickness of the light-reflective adhesive is larger, the proportion of bright areas of the liquid crystal mixture will also decrease. From above, in addition to determining the thermal phase separation temperature and the thermal phase separation time according to a changing rate of the bright area ratio of the liquid crystal mixture, the bright area ratio of the micro-cell structures can also be adjusted according to the proportion of the photocurable adhesive material.

In one embodiment, the thermal phase separation temperature ranges from 10° C. to 25° C., such as 11° C., 12° C., 13° C., 15° C., 17° C., 19° C., 21° C., 23° C., or 24° C., In another embodiment, the thermal phase separation time ranges from 40 to 75 seconds, such as 42 seconds, 45 seconds, 48 seconds, 52 seconds, 56 seconds, 60 seconds, 64 seconds, 67 seconds 70 seconds, or 72 seconds.

An embodiment is provided to prove that the micro-cell structures produced by the method for fabricating micro-cell structures of the present disclosure have the above-mentioned effects.

First, a liquid crystal mixture is provided and includes 62.3 wt % of a negative type liquid crystal LC2081, 1 wt % of salt ionic TBATFB, 16.7 wt % of chiral molecule R811, and 20 wt % of a photocurable adhesive NOA65. Then, the liquid crystal mixture is heated to a temperature of 110° C., and at this point the liquid crystal mixture is in an isotropy state. Then, the liquid crystal mixture at 110° C. is injected into a sample box and is cooled to 15° C. for 50 seconds. Finally, an ultraviolet light (about 365 nm) with an intensity of 5 mW/cm$^2$ is emitted to the sample box for 15 minutes to produce the micro-cell structures with a particle size of about between 50 to 100 microns, wherein a thickness of the network photo-curing adhesive is merely between 0.1 and 10 um.

Figure 6:
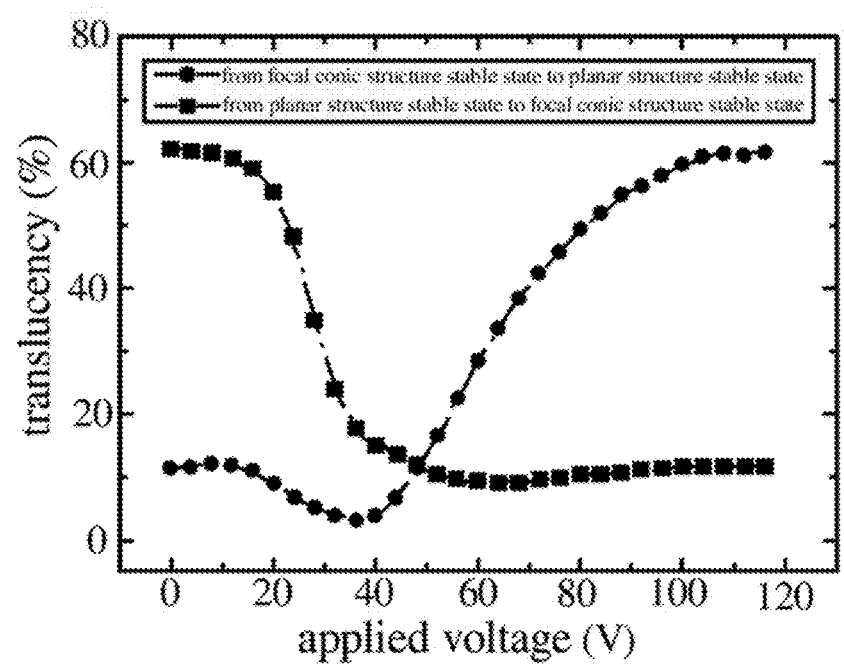
FIG. 6 is an experimental data diagram of translucency of switching the micro-cell structures between the bistable states according to an embodiment of the present disclosure.

A voltage test is performed on the above micro-cell structures. Please referring to FIG. 6, FIG. 6 is an experimental data diagram of translucency of switching the micro-cell structures between the bistable states according to an embodiment of the present disclosure. When an alternating current (AC) voltage of 60 V at a frequency of 60 Hz is applied on the micro-cell structures of the embodiment, the micro-cell structures of the embodiment is switched to a scattering status, and the micro-cell structures maintains in the focal conic structure stable state after releasing the applied voltage. When an alternating current (AC) voltage of 120 V at a frequency of 6000 Hz is applied on the micro-cell structures of the embodiment, the micro-cell structures of the embodiment is switched to a scattering status, and the micro-cell structures maintains in the light-transmitting planar structure stable state after releasing the applied voltage.

The present disclosure has been described with preferred embodiment thereof and it is understood that many changes and modifications to the described embodiment can be carried out without departing from the scope and the spirit of the disclosure that is intended to be limited only by the appended claims.

The invention claimed is:

1. A method for fabricating micro-cell structures, comprising steps of: providing a liquid crystal mixture comprising: 15 wt % to 91 wt % of a negative type liquid crystal material; 0.0001 wt % to 5 wt % of a salt ionic material; 3 wt % to 40 wt % of a chiral molecule material; and 5 wt % to 40 wt % of a photocurable adhesive material; performing a heating step on the liquid crystal mixture at a temperature ranging from 40° C. to 150° C.; performing a heat induced phase separation step on the liquid crystal mixture at a thermal phase separation temperature for a thermal phase separation time such that the liquid crystal mixture forms a plurality of liquid crystal particles and a network photo-curing adhesive, wherein the thermal phase separation temperature and the thermal phase separation time are determined by a changing rate of a percentage of an area of the liquid crystal mixture that contains light transmitting liquid crystal material; and performing a photo-curing step on the liquid crystal mixture by emitting an ultraviolet light so that the liquid crystal particles and the network photo-curing adhesive further form a plurality of micro-cell structures.

2. The method for fabricating the micro-cell structures according to claim 1, wherein the percentage of an area of the liquid crystal mixture that contains light transmitting liquid crystal material is proportional to an area ratio of the liquid crystal particles distributed in the liquid crystal mixture.

3. The method for fabricating the micro-cell structures according to claim 2, wherein the changing rate of the percentage of an area of the liquid crystal mixture that contains light transmitting liquid crystal material is a rate of the percentage of an area of the liquid crystal mixture that contains light transmitting liquid crystal material changing with passage of per unit time.

4. The method for fabricating the micro-cell structures according to claim 3, wherein the changing rate of the percentage of an area of the liquid crystal mixture that contains light transmitting liquid crystal material changes from −1% to +1% with passage of per second.

5. The method for fabricating the micro-cell structures according to claim 1, wherein the negative type liquid crystal material is selected from a group consisting of a negative type liquid crystal MLC2081, a negative type liquid crystal MLC2078, a negative type liquid crystal ZLI-2806, and a negative type liquid crystal ZLI2293.

6. The method for fabricating the micro-cell structures according to claim 1, wherein the salt ionic material is selected from a group consisting of a salt ionic tetrabutyammonium tetrafluoroborate (TBATFB), a salt ionic R6G, NaCl, $KNO_3$, and $CaSO_4$.

7. The method for fabricating the micro-cell structures according to claim 1, wherein the chiral molecule material is selected from a group consisting of chiral molecule 5811, chiral molecule R811, chiral molecule 51011, chiral molecule R1011, chiral molecule 55011, and chiral molecule R5011.

8. The method for fabricating the micro-cell structures according to claim 1, wherein the photocurable adhesive material is selected from a group consisting of a photocurable adhesive NOA63, a photocurable adhesive NOA65, a photocurable adhesive NOA73, and a photocurable adhesive NOA81.

9. The method for fabricating the micro-cell structures according to claim 1, further comprising a disposing step after the heating step is performed, wherein the disposing step is to dispose the heated liquid crystal mixture between a first transparent substrate and a second transparent substrate.

10. The method for fabricating the micro-cell structures according to claim 1, wherein the photo-curing step is performed on the liquid crystal mixture by emitting the ultraviolet light with an intensity of 0.1 to 100 mW/cm$^2$ for 0.1 to 20 minutes.

* * * * *